United States Patent
Guerrero

(10) Patent No.: US 9,414,610 B2
(45) Date of Patent: Aug. 16, 2016

(54) EGG CHILLER AND METHOD OF USE

(71) Applicant: Gustavo Guerrero, Ventura, CA (US)

(72) Inventor: Gustavo Guerrero, Ventura, CA (US)

( * ) Notice: Subject to any disclaimer, the term of this patent is extended or adjusted under 35 U.S.C. 154(b) by 308 days.

(21) Appl. No.: 13/922,457

(22) Filed: Jun. 20, 2013

(65) Prior Publication Data

US 2014/0137575 A1 May 22, 2014

Related U.S. Application Data

(60) Provisional application No. 61/729,094, filed on Nov. 21, 2012.

(51) Int. Cl.
*A23B 5/04* (2006.01)

(52) U.S. Cl.
CPC .................................... *A23B 5/04* (2013.01)

(58) Field of Classification Search
CPC .............. F25D 2303/0831; F25D 2303/08223; F25D 2303/0822; F25D 2331/812; F25D 3/08; F25C 1/24; F25C 1/246
USPC ............................................... 62/64; 220/508
See application file for complete search history.

(56) References Cited

U.S. PATENT DOCUMENTS

| | | | | |
|---|---|---|---|---|
| 4,366,941 A | * | 1/1983 | Harris | 249/120 |
| 4,554,798 A | * | 11/1985 | D'Amour et al. | 62/457.5 |
| 5,538,136 A | * | 7/1996 | Onneweer | B65D 85/324 206/508 |
| 5,694,836 A | * | 12/1997 | Blevins | 99/517 |
| 6,708,741 B1 | * | 3/2004 | Berry | B67D 3/0009 141/351 |
| 2004/0265458 A1 | * | 12/2004 | Christopher | 426/524 |
| 2006/0186136 A1 | * | 8/2006 | Wauters | B67D 1/0425 222/105 |
| 2009/0320517 A1 | * | 12/2009 | Lavallee | 62/457.2 |
| 2013/0233011 A1 | * | 9/2013 | Wolf | F25D 3/08 62/457.5 |

* cited by examiner

*Primary Examiner* — Mohammad M Ali

(57) ABSTRACT

An egg chiller is provided that can be used to chill both raw and hard-boiled eggs. The egg chiller has a base tray and at least one additional tray. An interior volume of both the base tray and the at least one additional tray is filled with an amount of water through an interior opening. A plug is inserted into the interior opening of both the base tray and the at least one additional tray in order to prevent the amount of water from leaking out. After the amount of water is allowed to freeze, eggs are placed within a plurality of egg-bottom recesses of both the base tray and the at least one additional tray. The at least one additional tray is then stacked on top of the base tray, allowing for compact storage of the egg chiller.

12 Claims, 8 Drawing Sheets

EGG CHILLER AND METHOD OF USE

The current application claims a priority to the U.S. Provisional Patent application Ser. No. 61/729,094 filed on Nov. 21, 2012.

FIELD OF THE INVENTION

The present invention relates generally to a storage container. More specifically, the present invention is a storage container designed to chill eggs.

BACKGROUND OF THE INVENTION

Eggs are a common food item in recipes and are a regular part of people's diet. They are commonly stored in a refrigerator, as refrigeration extends the shelf life of eggs and helps to ensure that they are safe to eat. Traditionally eggs are purchased and stored in egg cartons, however, the material of these egg cartons is not optimized to protect the eggs. As such, alternative egg storage devices have been designed that are sturdier than traditional egg cartons. Many of these alternative egg storage devices are also designed to allow for eggs to be stored in a compact manner. While these alternative storage devices offer compact storage and more protection, they do not allow the eggs to be chilled when stored outside of a refrigerator. For this reason, egg trays have been designed that allow for eggs to be stored and chilled outside of a refrigerator. The bottom half of these trays are filled with water and then frozen. Eggs are then placed in the frozen mold and chilled from below. While these trays chill the eggs, they only do so from one side.

The egg chilling trays described above are often only intended for personal use as they cannot accommodate a large volume of eggs. As such, food facilities often employ alternative methods of storing and chilling eggs. These methods include storing the eggs in bins filled with ice, placing eggs in top well bins or simply storing eggs in their provided egg cartons in a refrigerator. Due to an egg's shape, many gaps are present when eggs are stored on top of one another in bins or top well containers. As a result, there is minimal surface contact between eggs and the walls of the containers and between the eggs themselves, and thus there is minimal surface area available for heat transfer to occur in order to chill the eggs. It is also less likely for the eggs stored on top to maintain correct temperatures when using these storage containers. If eggs are simply stored in their provided egg cartons, then they must be refrigerated, resulting in a constant need to retrieve eggs from refrigeration units.

Therefore it is the object of the present invention to provide an egg chiller that chills eggs more efficiently and can be compactly stored. The present invention utilizes multiple trays, each having a plurality of egg-bottom recesses and egg-top recesses, that can be stacked on top of one another. The trays are first filled with water and then allowed to freeze. Eggs are then placed within the egg-bottom recesses. The egg-top recesses ensure that the eggs are completely enclosed when the trays are stacked on top of each other. A base tray has a flat bottom provides support for the additional trays stacked on top. The stackable design of the present invention reduces the amount of space required to store eggs and increases the amount of contact surface between the eggs and ice, as the eggs stored between trays are completely enclosed. The present invention assures the proper holding temperature for raw shelled eggs and is ideal for storing and chilling eggs in food facility operations, as well as on camping trips, at festivals or any other events where a temporary cold unit is needed. The present invention can also be used to chill hard boiled eggs in addition to raw eggs.

DETAIL DESCRIPTIONS OF THE INVENTION

All illustrations of the drawings are for the purpose of describing selected versions of the present invention and are not intended to limit the scope of the present invention.

Figure 1:
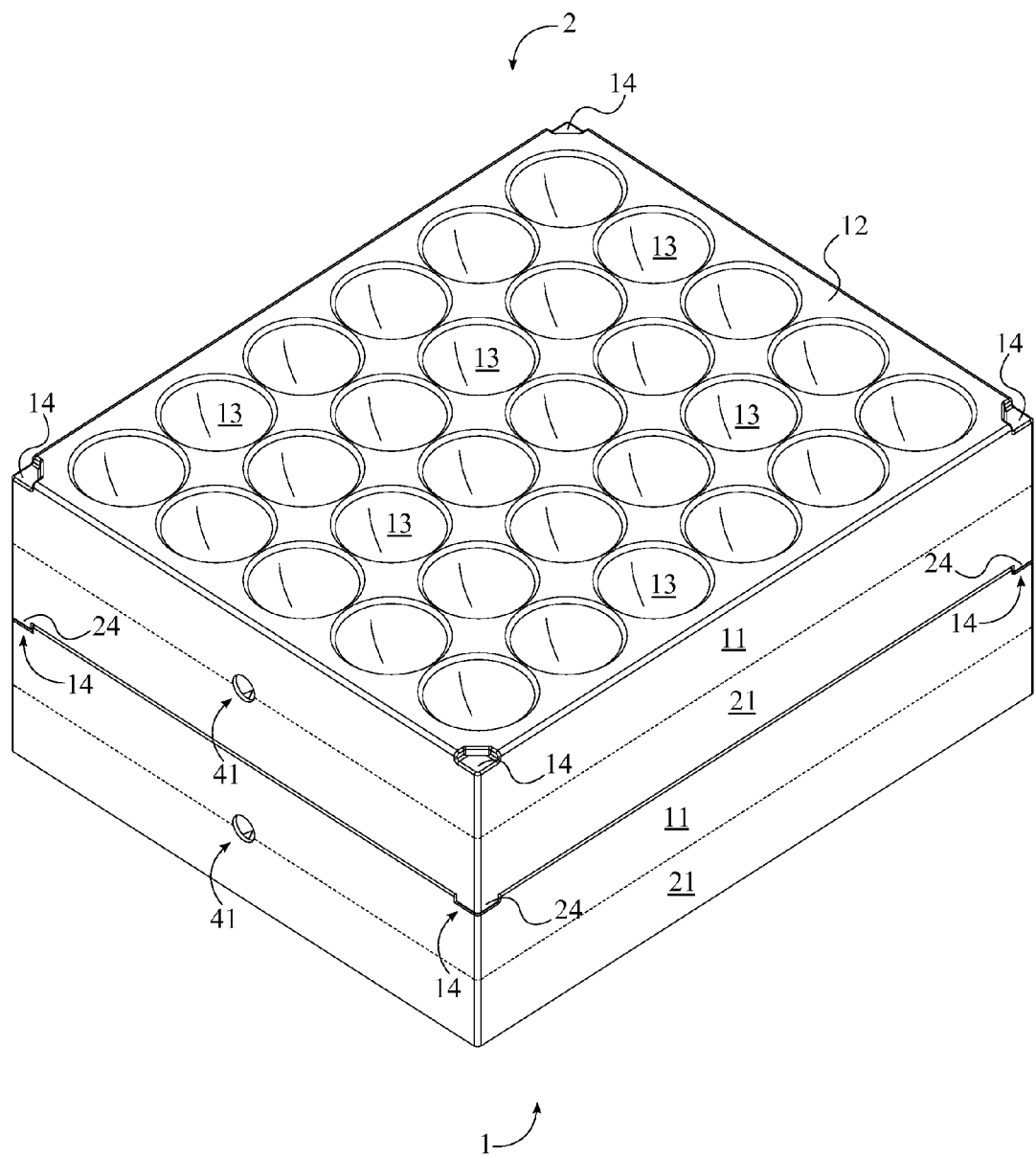
FIG. 1 is a perspective view of the egg chiller.

The present invention is an egg chiller and a method of using said egg chiller. The egg chiller provides multiple stacking trays that allow a user to both store and chill eggs. The unique design of the stacking trays allows eggs to be stored in a more compact manner and allows eggs to be chilled more efficiently. In reference to FIG. 1, the egg chiller comprises a base tray 1 and at least one additional tray 2. The base tray 1 provides a container for stacking a first layer of eggs and supports each of the at least one additional tray 2 that is subsequently stacked on top. Each of the at least one additional tray 2 can then be stacked one on top of the other in order to accommodate the desired number of eggs.

Figure 2:
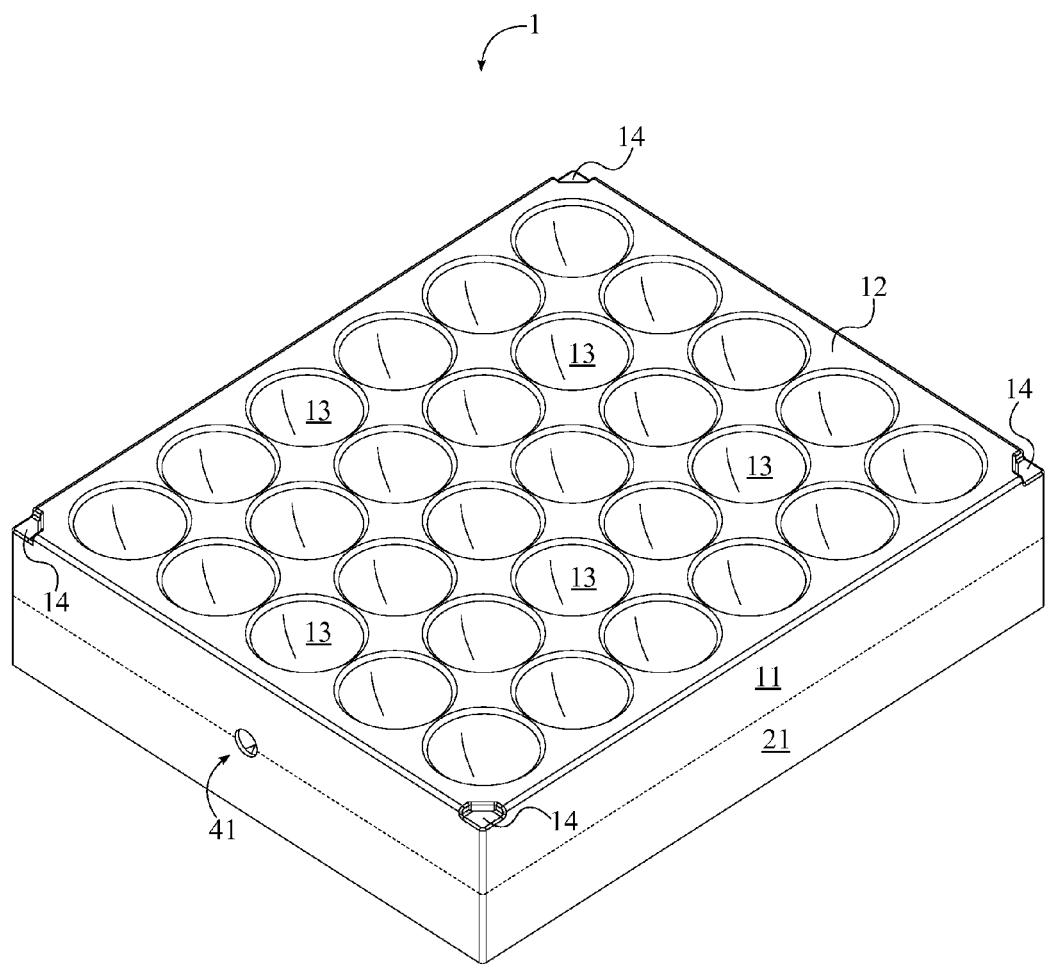
FIG. 2 is a perspective view of the base tray.
Figure 3:
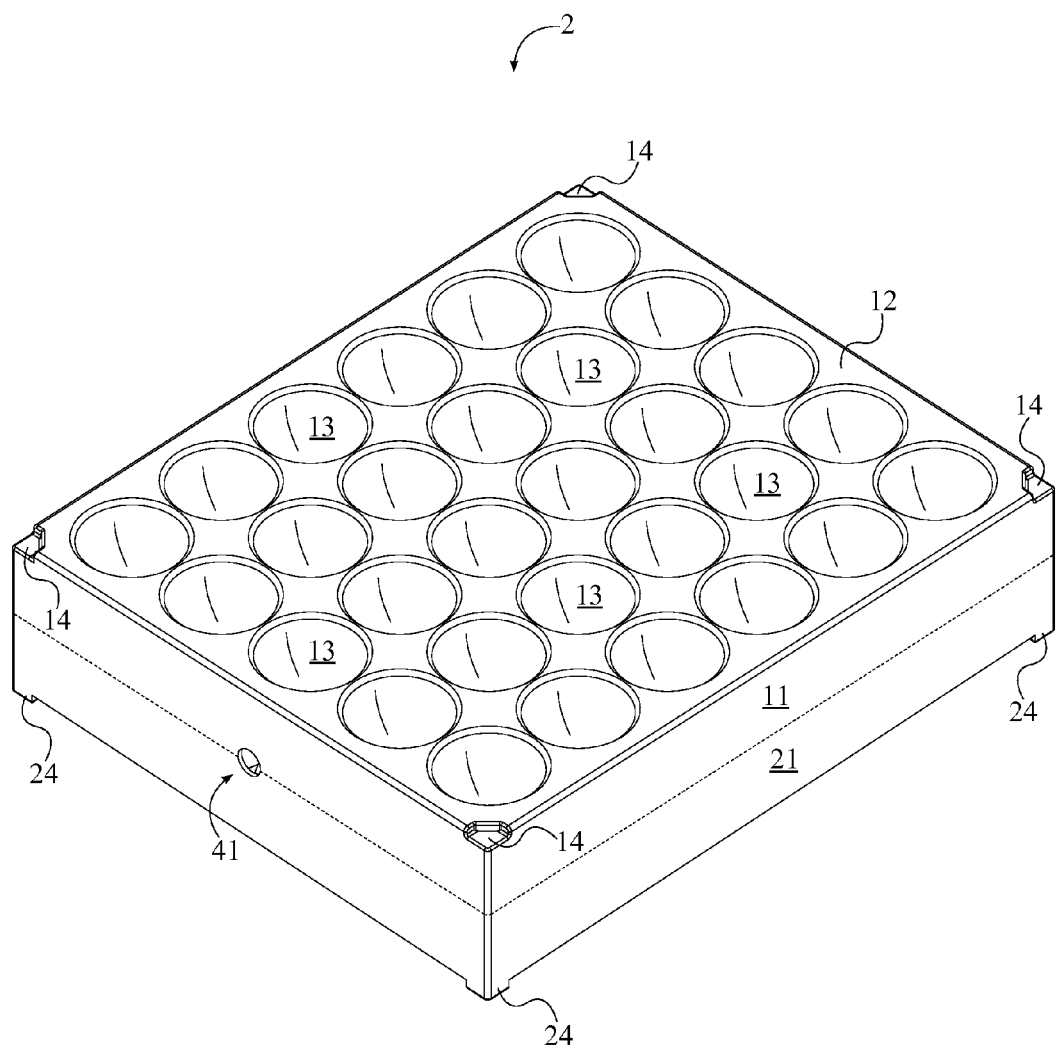
FIG. 3 is a perspective view showing the top portion of the at least one additional tray.
Figure 10:
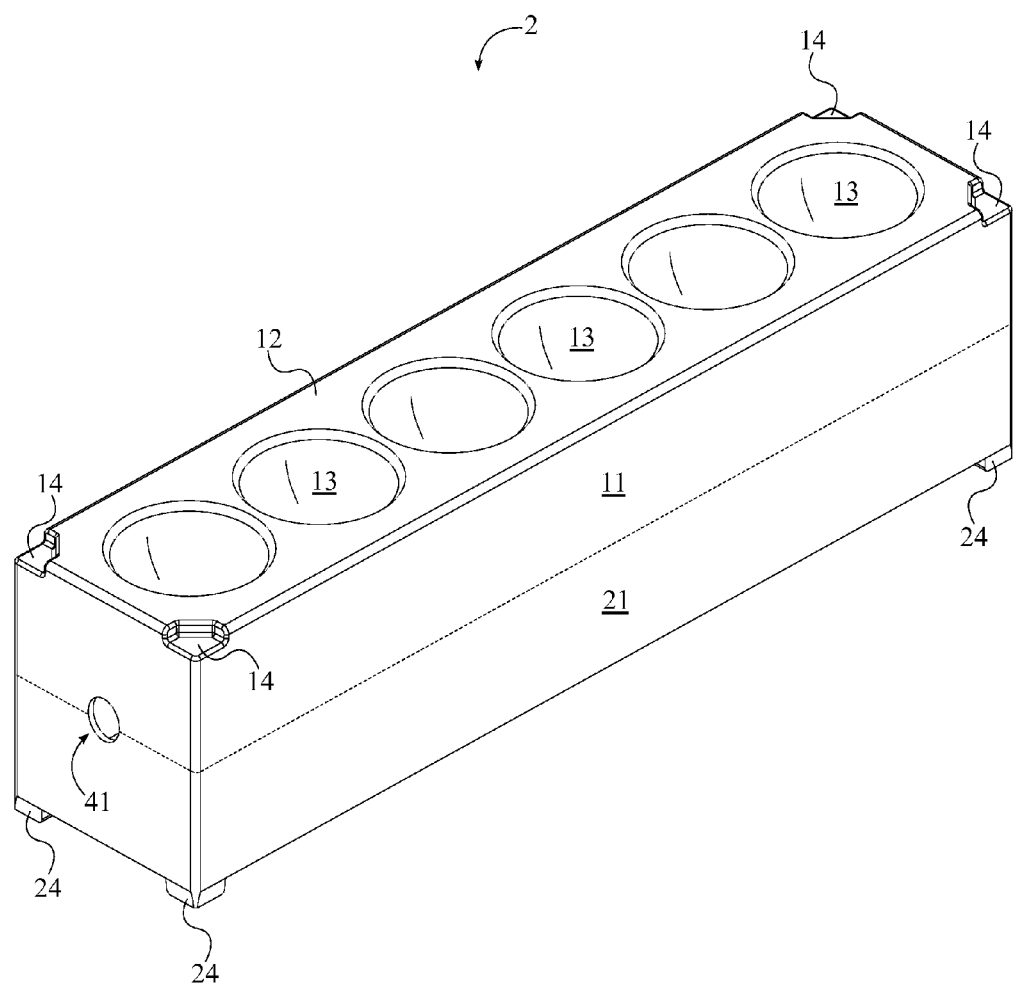
FIG. 10 is a perspective view of an alternatively sized tray.

The base tray 1 and the at least one additional tray 2 can be constructed to any size in order to chill different amounts of eggs and to meet various storage space constraints. For example, the trays depicted in FIG. 2-3 are designed for high volume operations and can each hold thirty eggs, while the tray depicted in FIG. 10 is designed for low volume operations and can only accommodate six eggs. In the preferred embodiment of the present invention, the base tray 1 and the at least one additional tray 2 are constructed as a single blow molded piece, however, they can be constructed in any other manner. Ideally, a polycarbonate food safe Bisphenol A (BPA) free plastic is used to construct the base tray 1 and the at least one additional tray 2, although any material(s) may be used.

The base tray 1 and the at least one additional tray 2 are similar components and each comprise a top portion 11, a bottom portion 21, an interior volume 31, an interior opening 41, and a plug 51. In reference to FIG. 2-3, the top portion 11 of both the base tray 1 and the at least one additional tray 2 is identical. The top portion 11 is adjacently connected to the bottom portion 21 and, together, the top portion 11 and the bottom portion 21 form the body of the base tray 1 and the at least one additional tray 2. The top portion 11 comprises a top surface 12, a plurality of egg-bottom recesses 13, and a plurality of leg receptacles 14. The top surface 12 is the exterior face positioned on the top portion 11 opposite of the bottom portion 21. The plurality of egg-bottom recesses 13 is equally spaced across the top portion 11 and traverses into the top surface 12. Each of the plurality of egg-bottom recesses 13 is an open volume of space delineated by the design of the top portion 11 and is shaped to receive the bottom half of an egg. In this way, eggs are placed in the base tray 1 and the at least one additional tray 2 in the same manner as in a traditional egg carton.

In further reference to FIG. 2-3, the plurality of leg receptacles 14 is also spaced about the top portion 11 and is positioned perimetrically around the plurality of egg-bottom recesses 13. Similar to the plurality of egg-bottom recesses 13, the plurality of leg receptacles 14 traverses into the top surface 12. Each of the plurality of leg receptacles 14 is a notch cut into the top portion 11 and is shaped to receive one of the plurality of legs 24, which is described hereinafter and is part of the bottom portion 21 of the at least one additional tray 2. The plurality of leg receptacles 14 helps to ensure the stability of the egg chiller when each of the at least one additional tray 2 is stacked on top of each other or on top of the base tray 1.

While the top portion 11 of the base tray 1 and the at least one additional tray 2 are identical, the same is not true for the bottom portion 21. The bottom portion 21 of the base tray 1 is flat such that it may rest on a flat surface, while the bottom portion 21 of the at least one additional tray 2 is designed to rest on top of the base tray and to receive the top half of eggs. In reference to FIG. 4, the bottom portion 21 of the at least one additional tray 2 comprises a bottom surface 22, a plurality of egg-top recesses 23, and a plurality of legs 24. The bottom surface 22 is the exterior face positioned on the bottom portion 21 of the at least one additional tray 2 opposite of the top portion 11. The plurality of egg-top recesses 23 is equally spaced across the bottom portion 21 and traverses into the bottom surface 22. Each of the plurality of egg-top recesses 23 is an open volume of space delineated by the design of the bottom portion 21 and is shaped to receive the top half of an egg. In this way, each of the at least one additional tray 2 may be stacked on top of each other or the base tray 1 in order to fully encompass the eggs of the tray below.

Figure 4:
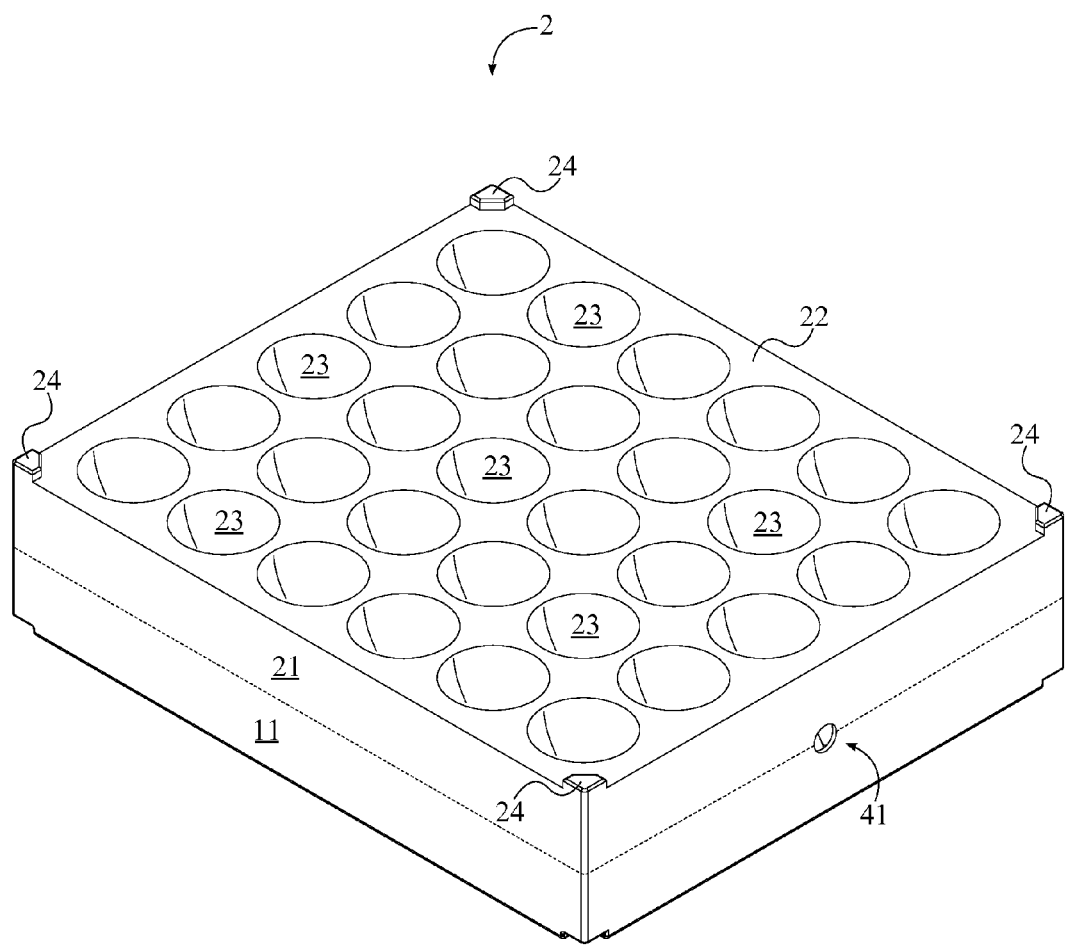
FIG. 4 is a perspective view showing the bottom portion of the at least one additional tray.

In further reference to FIG. 4, the plurality of legs 24 is also spaced about the bottom portion 21 and is positioned perimetrically around the plurality of egg-top recesses 23. Each of the plurality of legs 24 is an extruded member of the bottom portion 21 and, as such, the plurality of legs 24 traverses out of the bottom surface 22. When the at least one additional tray 2 is stacked on top of the base tray 1, the plurality of legs 24 engages the plurality of leg receptacles 14 of the base tray 1. The insertion of the plurality of legs 24 into the plurality of leg receptacles 14 prevents the at least one additional tray 2 from shifting while stacked, which in turn prevents any eggs stored in the tray below from breaking.

Figure 5:
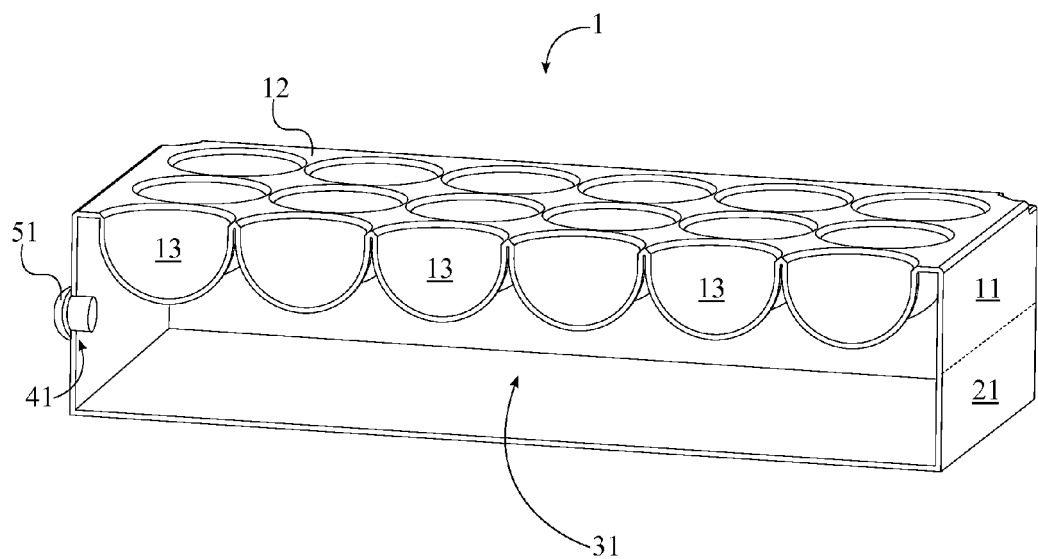
FIG. 5 is a perspective sectional view of the base tray.
Figure 6:
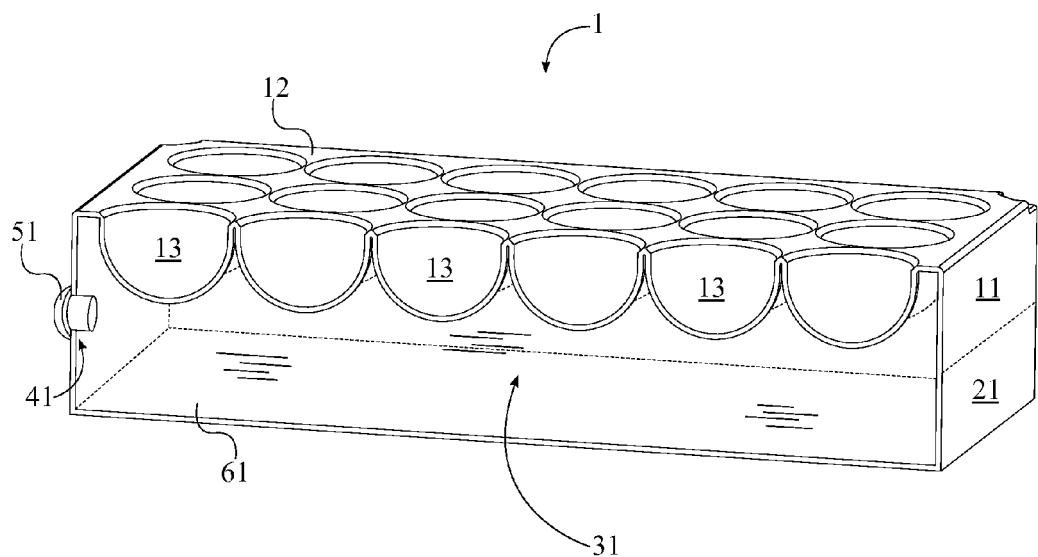
FIG. 6 is a perspective sectional view of the base tray filled with an amount of water.
Figure 7:
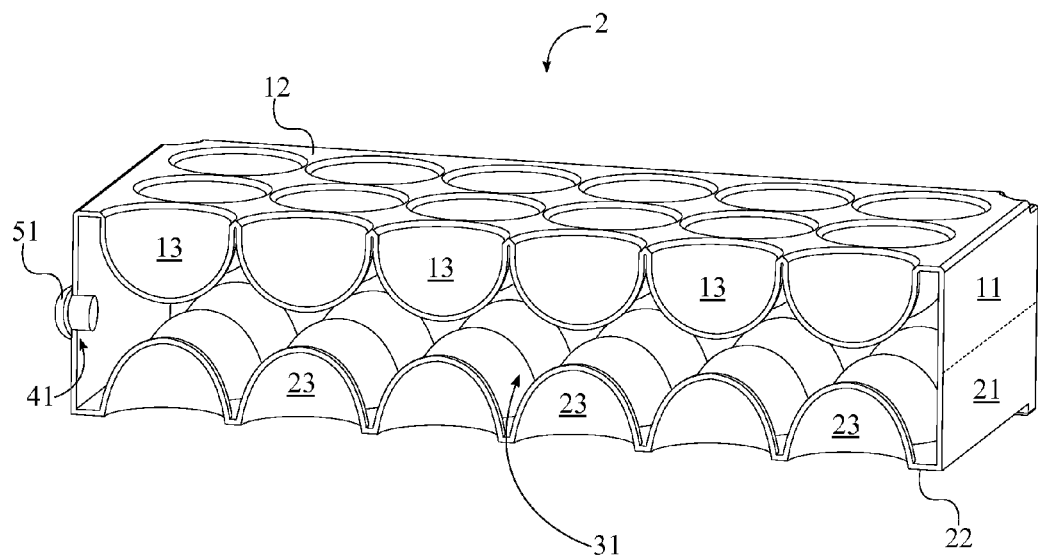
FIG. 7 is a perspective sectional view of the at least one additional tray.
Figure 8:
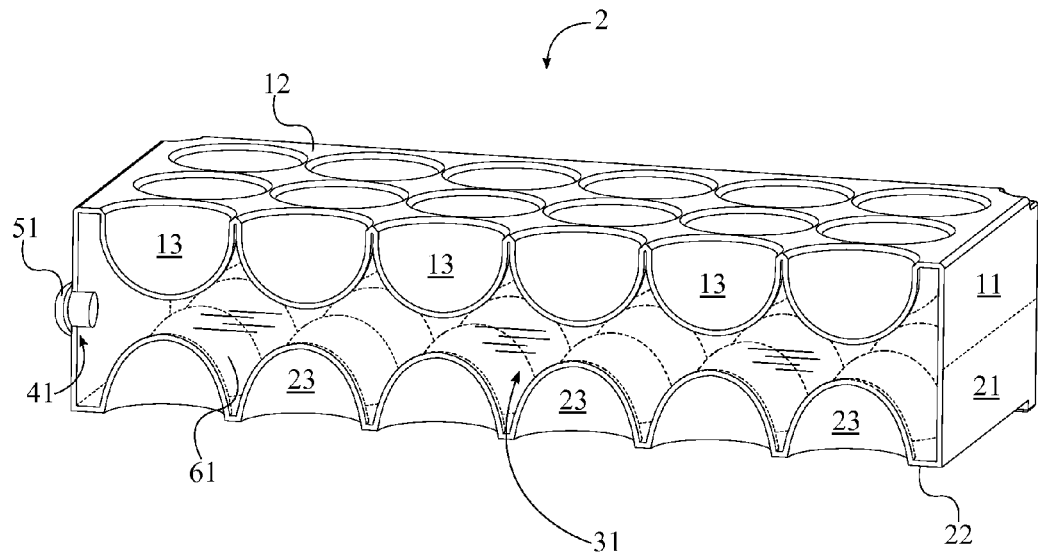
FIG. 8 is a perspective sectional view of the at least one additional tray filled with an amount of water.

Both the base tray 1 and the at least one additional tray 2 have an interior volume 31 that is positioned within the top portion 11 and the bottom portion 21. The interior opening 41 traverses into the interior volume 31 and provides access to the interior volume 31. In the preferred embodiment of the present invention, the interior volume 31 is filled with an amount of water 61, as shown in FIG. 6 and FIG. 8. It is also possible for any other freezable liquid or gel to be used in place of the amount of water 61. In reference to FIG. 5, the interior opening 41 of the base tray 1 is laterally positioned into the base tray 1, such that the interior volume 31 of the base tray 1 is filled through the side of the base tray 1. After the interior volume 31 of the base tray 1 has been filled, the plug 51 of the base tray 1 is engaged within the interior opening 41 of the base tray 1. The plug 51 is a removable stopper, which prevents the amount of water 61 from escaping out of the interior volume 31. In reference to FIG. 7, similar to the base tray 1, the interior opening 41 of the at least one additional tray 2 is laterally positioned into the at least one additional tray 2, and the plug 51 of the at least one additional tray 2 is engaged within the interior opening 41 of the at least one additional tray 2.

Figure 9:
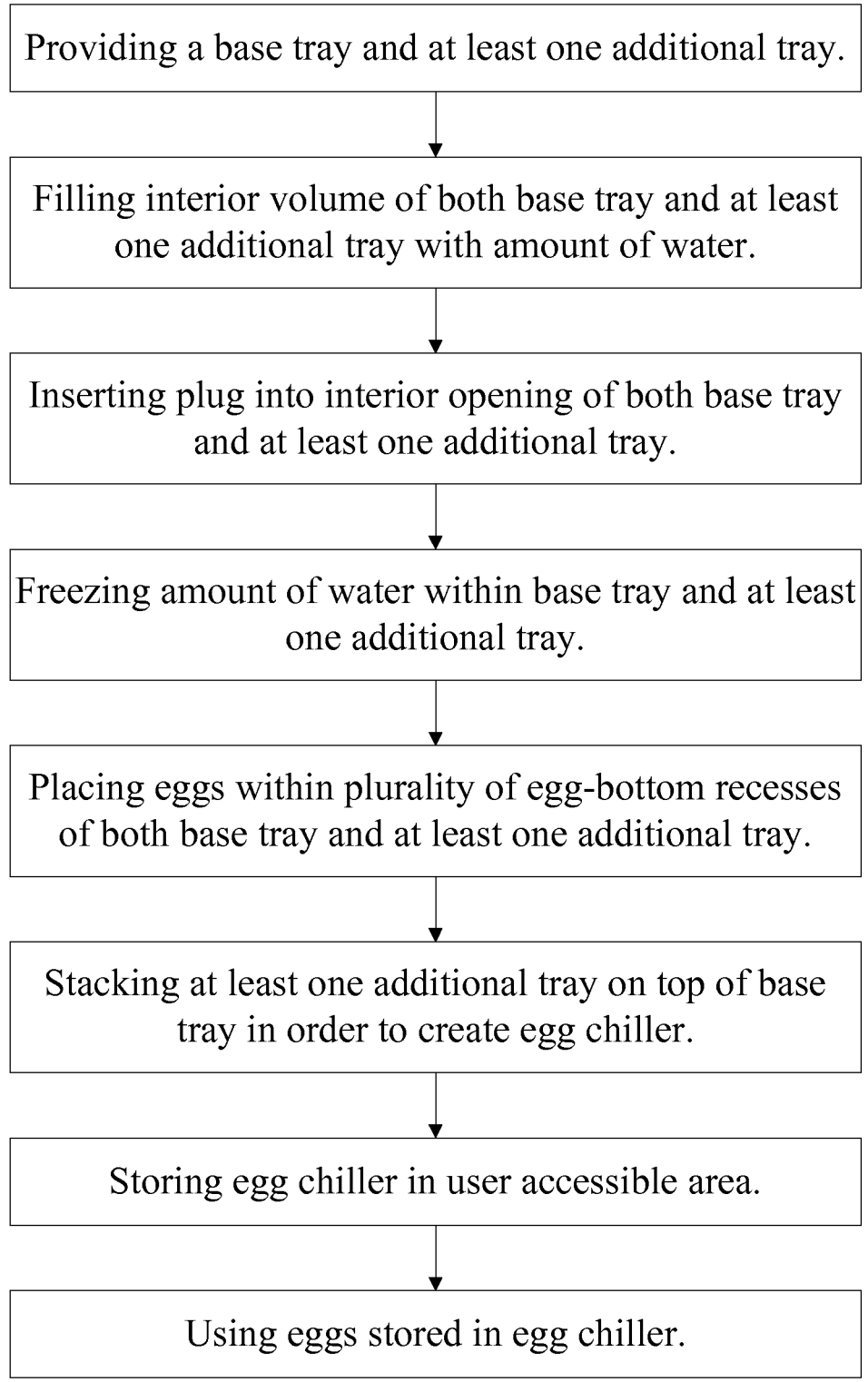
FIG. 9 is a flowchart describing the preferred method of use of the egg chiller.

In reference to FIG. 9, the present invention also includes a preferred method of using the egg chiller. Provided a base tray 1 and at least one additional tray 2, the interior volume 31 of both the base tray 1 and the at least one additional tray 2 is first filled with an amount of water 61. The plug 51 of the base tray 1 is then inserted into the interior opening 41 of the base tray 1, while the plug 51 of the at least one additional tray 2 is inserted into the interior opening 41 of the at least one additional tray 2. Once filled, the base tray 1 and the at least one additional tray 2 are placed in a freezer in order to freeze the amount of water 61 within the base tray 1 and the at least one additional tray 2. After the amount of water 61 has been frozen, the base tray 1 and the at least one additional tray 2 are removed from the freezer and eggs are paced within the plurality of egg-bottom recesses 13 of both the base tray 1 and the at least one additional tray 2. The at least one additional tray 2 is then stacked on top of the base tray 1 in order to create the egg chiller. The egg chiller can then be stored in a user accessible area where the eggs can be retrieved and used. Ideally, the egg chiller is stored in a refrigerator in order to keep the eggs at a food safe temperature for a longer period of time. Eggs are first used from the at least one additional tray 2, after which the at least one additional tray 2 is removed from the base tray 1. Once the at least one additional tray 2 is removed, eggs can then be used from the base tray 1.

Although the invention has been explained in relation to its preferred embodiment, it is to be understood that many other possible modifications and variations can be made without departing from the spirit and scope of the invention as hereinafter claimed.

What is claimed is:

1. An egg chiller comprises:
    a base tray;
    an at least one additional tray;
    the base tray and the at least one additional tray each comprise a top portion, a bottom portion, an interior volume, an interior opening, and a plug;
    the top portion comprises a top surface, a plurality of egg-bottom recesses and a plurality of leg receptacles;
    the bottom portion of the at least one additional tray comprises a bottom surface, a plurality of egg-top recesses and a plurality of legs;
    the bottom portion being adjacently connected to the top portion;
    the top surface being positioned on the top portion opposite of the bottom portion;
    the bottom surface being positioned on the bottom portion of the at least one additional tray opposite of the top portion;
    the top surface being an exterior face positioned on the top portion opposite the bottom portion;
    each of the plurality of egg-bottom recesses being an open volume of space delineated by the top portion and shaped as an impression of a bottom half of an egg;
    the plurality of leg receptors spaced around the top portion;
    each of the plurality of leg receptors being a notch cut in the top portion;
    each of the plurality of receptors is adapted to receive one of the plurality of legs;
    each of the plurality of egg-top recesses being an open volume of space delineated by the bottom portion and shaped as an impression of a top half of an egg;

each of the plurality of legs being an extruded member of the bottom portion and traverses out of the bottom surface;
the plurality of egg-bottom recesses being equally spaced across the top portion;
the plurality of leg receptacles being positioned perimetrically around the plurality of egg-bottom recesses;
the plurality of egg-bottom recesses and the plurality of leg receptacles traversing into the top surface;
the interior opening of the at least one additional tray being laterally positioned into the at least one additional tray;
the plug of the at least one additional tray being engaged within the interior opening of the at least one additional tray;
the plurality of legs engaging the plurality of leg receptacles of the base tray.

2. The egg chiller as claimed in claim 1 comprises:
the plurality of egg-top recesses being equally spaced about the bottom portion of the at least one additional tray;
the plurality of legs being positioned perimetrically around the plurality of egg-top recesses;
the plurality of egg-top recesses traversing into the bottom surface; and
the plurality of legs traversing out of the bottom surface.

3. The egg chiller as claimed in claim 1 comprises:
the interior volume being positioned within the top portion and the bottom portion; and
the interior opening traversing into the interior volume.

4. The egg chiller as claimed in claim 1 comprises:
the interior opening of the base tray being laterally positioned into the base tray; and
the plug of the base tray being engaged within the interior opening of the base tray.

5. The egg chiller as claimed in claim 1, wherein the interior volume is filled with an amount of water.

6. An egg chiller comprises:
a base tray;
an at least one additional tray;
the base tray and the at least one additional tray each comprise a top portion, a bottom portion, an interior volume, an interior opening, and a plug;
the top portion comprises a top surface, a plurality of egg-bottom recesses and a plurality of leg receptacles;
the bottom portion of the at least one additional tray comprises a bottom surface, a plurality of egg-top recesses and a plurality of legs;
the bottom portion being adjacently connected to the top portion;
the top surface being positioned on the top portion opposite of the bottom portion;
the bottom surface being positioned on the bottom portion opposite of the top portion;
the plurality of egg-bottom recesses being equally spaced across the top portion;
the plurality of leg receptacles being positioned perimetrically around the plurality of egg-bottom recesses;
the plurality of egg-bottom recesses and the plurality of leg receptacles traversing into the top surface;
the plurality of egg-top recesses being equally spaced about the bottom portion of the at least one additional tray;
the plurality of legs being positioned perimetrically around the plurality of egg-top recesses;
the plurality of egg-top recesses traversing into the bottom surface;
the plurality of legs traversing out of the bottom surface;
the interior volume being positioned within the top portion and the bottom portion;
the interior opening traversing into the interior volume;
the top surface being the exterior face positioned on the top portion opposite the bottom portion;
each of the plurality of egg-bottom recesses being an open volume of space delineated by the top portion and shaped as an impression of a bottom half of an egg;
the plurality of leg receptors spaced around the top portion;
each of the plurality of leg receptors being a notch cut in the top portion;
each of the plurality of receptors is adapted to receive one of the plurality of legs;
each of the plurality of egg-top recesses being an open volume of space delineated by the bottom portion and shaped as an impression of a top half of an egg;
each of the plurality of legs being an extruded member of the bottom portion and traverses out of the bottom surface;
the interior opening of the at least one additional tray being laterally positioned into the at least one additional tray; and
the plug of the at least one additional tray being engaged within the interior opening of the at least one additional tray.

7. The egg chiller as claimed in claim 6 comprises:
the interior opening of the base tray being laterally positioned into the base tray; and
the plug of the base tray being engaged within the interior opening of the base tray.

8. The egg chiller as claimed in claim 6 comprises:
the plurality of legs engaging the plurality of leg receptacles of the base tray.

9. The egg chiller as claimed in claim 6, wherein the interior volume is filled with an amount of water.

10. A method of using an egg chiller as claimed in claim 6 comprises the steps of:
providing a base tray and an at least one additional tray;
filling an interior volume of both the base tray and the at least one additional tray with an amount of water;
inserting a plug into an interior opening of both the base tray and the at least one additional tray;
freezing the amount of water within the base tray and the at least one additional tray;
placing eggs within a plurality of egg-bottom recesses of both the base tray and the at least one additional tray;
stacking the at least one additional tray on top of the base tray in order to create an egg chiller;
storing the egg chiller in a user accessible area; and
using the eggs stored in the egg chiller.

11. The method of using an egg chiller as claimed in claim 10 further comprises the steps of:
storing the egg chiller in a user accessible area, wherein the user accessible area is a refrigerator.

12. The method of using an egg chiller as claimed in claim 10 further comprises the steps of:
using the eggs from the at least one additional tray;
removing the at least one additional tray from the base tray; and
using the eggs from the base tray.

* * * * *